United States Patent [19]

Heichler

[11] Patent Number: 4,985,903
[45] Date of Patent: Jan. 15, 1991

[54] BUS COUPLING CIRCUIT

[75] Inventor: Johannes Heichler, Murrhardt, Fed. Rep. of Germany

[73] Assignee: ANT Nachrichtentechnik GmbH, Backnang, Fed. Rep. of Germany

[21] Appl. No.: 422,516

[22] Filed: Oct. 17, 1989

[30] Foreign Application Priority Data

Oct. 18, 1988 [DE] Fed. Rep. of Germany ....... 3835458
Feb. 20, 1989 [DE] Fed. Rep. of Germany ....... 3905109

[51] Int. Cl.$^5$ ...................... H04B 3/00; H04L 25/00
[52] U.S. Cl. ...................................... 375/36; 307/270
[58] Field of Search ............... 375/7, 8, 36; 370/85.1, 370/85.11; 307/270, 242; 178/63 R, 63 B

[56] References Cited

U.S. PATENT DOCUMENTS

| | | | |
|---|---|---|---|
| 3,541,239 | 11/1970 | Reid | 375/36 |
| 3,875,332 | 4/1975 | Fletcher et al. | 307/270 |
| 4,445,222 | 4/1984 | Smitt | 375/36 |

FOREIGN PATENT DOCUMENTS

| | | | |
|---|---|---|---|
| 2443770 | 8/1980 | France | 375/36 |
| 2452207 | 11/1980 | France | 375/36 |

OTHER PUBLICATIONS

"Regelungstechnische Praxis", [Regulatory Practice], vol. 25, 1983, No. 10, pp. S61–S64, and No. 10, pp. S69 and S70.
"Prinzipien digitaler Kippschaltungen", [Principles of Digital Trigger Circuits], by Von Edgar Baeger and Horst Bienert, published by Siemens Aktiengesellschaft, pp. 44–51.

*Primary Examiner*—Benedict V. Safourek
*Assistant Examiner*—Stephen Chin
*Attorney, Agent, or Firm*—Spencer & Frank

[57] ABSTRACT

A bus coupling circuit couples data between a transmitting subscriber and a receiving subscriber using a data transfer bus. Each subscriber includes a bidirectional driver for transmitting and receiving data. Each bidirectional driver includes an apparatus for reintroducing a direct voltage at the bus-sided input of each driver, and a direct voltage splitting device connected between the driver and the bus. Each driver has an input/output port. A hysteresis circuit is connected to each driver and includes a voltage divider disposed between the an input of the driver and a source of supply voltage. The voltage divider has a divider tap to provide a direct supply voltage at the driver, and includes first and second voltage divider resistors, these resistors having respective resistance values R2x and R3x which satisfy the following relationship:

$$\frac{R3x}{R2x + R3x} = \frac{1}{1+n}$$

where x represents the sequential number of the respective subscriber, and n is the number of tolerable driver short circuits; whereby the bus is fault tolerant for a plurality n of driver short circuits.

12 Claims, 4 Drawing Sheets

BUS COUPLING CIRCUIT

CROSS REFERENCE TO RELATED APPLICATION

The present disclosure relates to the subject matter disclosed in German Application No. P 38 35 458.6 and P 39 05 109.9 of October 18th, 1988 and February 20th, 1989, respectively, the entire specifications of which are incorporated herein by reference.

BACKGROUND OF THE INVENTION

The present invention relates to a bus coupling circuit between a data transfer device (bus) and at least one data transmitter and a data receiver as subscribers, with each subscriber including a bidirectional driver with direct voltage splitting means disposed between the driver and the bus to simultaneously constitute a working impedance for the driver, each driver having a hysteresis.

Such a bus coupling circuit is disclosed in "Regelungstechnische Praxis," [Regulatory Practice], Volume 25, 1983, No. 10, pages S61–S64, and No. 10, pages S69 and S70. In the bus coupling circuit disclosed there, a bus receiver has a hysteresis in order to suppress superposed noise signals.

Subscribers, e.g. data transmitters or data receivers, which are in communication with one another by way of a common bus, have driver circuits as interfaces. If a subscriber or an interface has a short circuit, the entire bus is often unusable. German Patent No. DE 3,433,150 discloses an interface arrangement composed of optocouplers which, if there are faults at the optocouplers due, for example, to a short circuit, prevent blockage of the connection between driver and data input by means of a control circuit associated with the optocouplers.

SUMMARY OF THE INVENTION

It is an object of the present invention to configure the bus coupling circuit between a data transfer device (bus) and at least one data transmitter and a data receiver as subscribers, in such a way that bidirectional operation at high data rates is possible even upon the occurrence of component malfunctions, and particularly upon the occurrence of short circuits.

The invention is drawn to a bus coupling circuit for coupling data between a transmitting subscriber and a receiving subscriber by way of a data transfer bus, each subscriber including: a bidirectional driver for transmitting and receiving data, each bidirectional driver including means for reintroducing a direct voltage at the bus sided inputs of each driver, an direct voltage splitting means constituting a working impedance for the driver and connected between the driver and the bus; each driver having a first input/output port which is remote from the bus and a second input/output port electrically connected to the bus, the improvement comprising: a source of direct supply voltage; a hysteresis circuit connected to each driver; the hysteresis circuit including a voltage divider which is responsive to alternating signals on the bus and which is disposed between the first input/output port of the driver and the source of direct supply voltage, the voltage divider having a divider tap disposed at the second driver input/output port to provide a direct supply voltage at the second input/output port of the driver; the voltage divider having a first voltage divider resistor connected between the first and second driver input/output port and a second voltage divider resistor connected between the second driver input/output port and the source of direct supply voltage, the first and second voltage divider resistors having respective resistance values R2x and R3x which satisfy the following relationship:

$$\frac{R3x}{R2x + R3x} = \frac{1}{1+n}$$

where x is a variable representing the sequential number of the respective subscriber, and n is the number of tolerable driver short circuits; whereby the bus is fault tolerant for a plurality n of driver short circuits.

In the apparatus according to German patent No. DE 3,433,150.A1, an erroneous actuation, e.g. due to a defective subscriber—e.g., a microprocessor—causes the optocoupler together with the driver to be blocked. If, however, the driver or the optocoupler itself has a short circuit, the entire bus may be blocked. According to the present invention, this drawback does not occur. Also, the apparatus according to German patent No. DE 3,433,150.A1 cannot be used with high data rates. The present invention requires relatively few switching means. All that is required per subscriber is a bidirectional driver which is available as an integrated component, three resistors and a capacitor.

In the present invention, the direct voltage value lost by galvanic separation is re-established without distortion by an additional hysteresis circuit. This permits operation with high data rates since only the edges of the data signal need be evaluated.

To additionally make the bus tolerant to fault, the components in the hysteresis circuit is dimensioned in such a way that bidirectional bus operation continues to be possible even if there are short circuits.

The arrangement according to the present invention permits bidirectional data transmission with an electrical fault tolerance of several, for example eight, short circuits. Other system faults, such as subscribers merely being absent, do not affect the bus. The bus system requires no clock pulse lines whatsoever for bus handling, thus increasing reliability. The bus coupling circuit according to the invention is also insensitive to erroneous controls since series resistances as components of a direct voltage splitting means additionally act as protective impedances. A driver output inadvertently "clamped".statically to the bus (in transmit operation) has the same non-disadvantageous effect on the bus as the short circuit of a driver output since static signals do not occur on the bus and the d.c. value is recovered from the edges of the data by artificial hysteresis.

In a second embodiment, the voltage divider resistances between the respective driver input near the bus and the current supply are dimensioned, relative to those drivers disposed in the vicinity of an end of the bus, so that their common parallel resistance approximately corresponds to the characteristic impedance of the bus. The signal shape of the digital signals in this embodiment transmitted over the bus is improved particularly for bit rates greater than 20 Mbit/s without substantially constricting fault tolerance. With otherwise identical marginal conditions with the first embodiment discussed above, more short circuits can be permitted with this embodiment. The bus coupling circuit according to the invention can have an amplitude dependent passive, dynamic termination as in the first embodiment, or an active bus termination as in the second embodiment, respectively.

BRIEF DESCRIPTION OF THE DRAWINGS

Embodiments of the invention will now be described in greater detail with reference to the drawing FIGURES.

DETAILED DESCRIPTION OF THE PREFERRED EMBODIMENT

Figure 1:
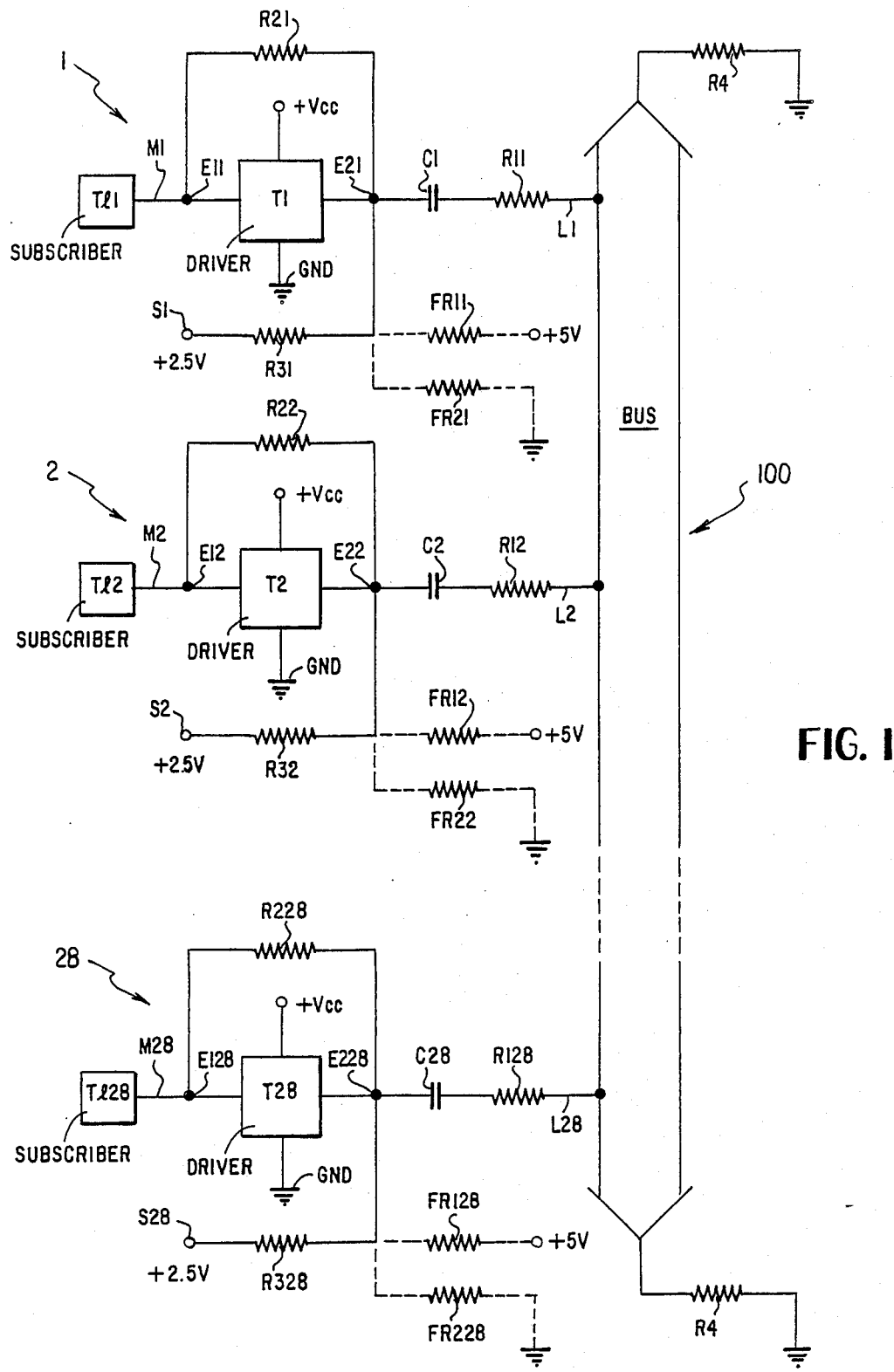
FIG. 1 shows a bus coupling circuit according to the invention.

A bus 100 is connected to a plurality of driver circuits 1-28 as shown in FIG. 1 by corresponding respective connecting lines L1-L28. The connecting lines L1-L28 connect the bus 100 to twenty-eight bidirectional drivers T1-T28, respectively. The bidirectional drivers T1-T28 are in turn respectively connected via connecting lines M1-M28 with corresponding subscribers T11-T128 which, for example, can be microprocessors. An example of a suitable circuit element which can be used for each of the bidirectional drivers T1-T28 is a commercially available integrated circuit designated as AC 245 which is used in FACT (Fairchild Advanced CMOS) technology. By way of the drivers T1-T28, two of the subscribers T11-T128, one representing a data transmitter and the other a data receiver or vice versa, can be switched in groups (8 bits) in real time with good fault tolerance.

A short circuit or an interruption at one of the subscribers T11-T128 must not have any serious influence on the total system which includes the bus 100 and the driver circuits T1-T28. A plurality of driver input/output ports terminals E21, E22, ..., E228 are connected to the corresponding connecting lines L1-L28 from the bus 100. The index numerals for the terminals E, i.e., numerals 21, 22, ..., 228, include a first index numeral, namely the numeral 2, and additional numerals 1-28 representing the sequential device number. A plurality of driver input/output ports terminals E11-E128 are respectively connected to corresponding ones of a plurality of connecting lines M1-M28. The driver input/output port pairs E11 and E21, E12 and E22, ..., E128 and E228 are connected together with the resistor pairs R21 and R31, R22 and R32, ..., R228 and R328 so as to form a voltage divider.

Additionally, a plurality of direct voltage splitting means is formed of a series connection of one of the capacitors C1, C2, ..., C28, and a respective one of the resistors R11, R12, ..., R128 for connection to the bus 100. This results in the following operation: with the system completely intact, one driver, for example T1, drives the bus 100 in a "transmit" operation or mode by way of the series connection of capacitor C1 and resistor R11. The direct voltage value of the driver T1 itself is then lost which is necessary for reasons of fault tolerance, as will be explained below. All other drivers of the bus 100 are now assumed to be switched to a "receive" operation or mode. Then, data information transmitted by T1 initially passes from the bus 100 through all of the resistors R11, R12, ..., R128, and through all of the capacitors C1, C2, ..., C28. The direct voltage value of the bus 100 is thus also lost. However, the direct voltage value is re-introduced—in the form of an artificial hysteresis—at each of the drivers T1-T28 with the aid of the corresponding voltage dividers as described in the foregoing which includes the resistor pairs R21 and R31, ..., R228 and R328, respectively, the reintroduced direct voltage value being either identical to the original direct voltage value or having another value.

The voltage dividers having the series connection of the voltage divider resistor pairs R21 and R31, ..., R228 and R328, respectively, lie between a corresponding one of the driver input/output ports terminals E11–E128 and a voltage source S1 which has a voltage which is selected to be one-half the supply voltage; for the drivers T1-T28 used in this preferred embodiment, the magnitude of the supply voltage is 5 Volts, and the magnitude of one-half of the supply voltage is therefore +2.5 V. For reasons of reliability it is advantageous not to provide a central voltage supply at one-half the supply voltage to each of the drivers T1-T28, but to provide corresponding resistor pairs FR11 and FR21, ..., FR128 and FR228, instead of the corresponding resistors R31-R328) as illustrated in dotted outline in FIG. 1, in which one resistor in each pair is connected to the voltage supply of the driver (e.g. 5 V) and the other to ground (GND). In this case, a threshold reference voltage of 2.5 V is separately available to each of the drivers T1-T28. In this variation, the circuitry shown in dotted outline would replace the circuit including the resistors R31-R328 and would be connected with the driver input/output ports terminals E211, E22, ..., E28. In order to prevent the bus 100 from taking on any arbitrary potential (with consequent danger of the capacitors breaking down) a bus-to-ground resistor R4 of about 100 KOhm is provided at both ends of the bus for the sake of redundancy. In a steady state (i.e., in which the corresponding one of the capacitors C1-C28 is in a recharged state), the hysteresis (discussed in the following) determines the sensitivity of the receiver with respect to the voltage difference to the threshold (for the FACT discussed above, the threshold voltage is 2.5 Volts). This sensitivity indicates the minimum signal amplitude (i.e., the amplitude of the signal on the bus 100 which is reduced due to short circuits in one of the driver circuits 1-28) at which the system ceases to function. Consequently, the value of the minimum signal amplitude determines, as shown in the following, how many short circuits in the driver circuits 1-28 the system is ultimately able to withstand. This fact will be explained with reference to the steady state, with reference to the bidirectional driver T1, as follows.

If, for example, a positive edge of a signal has appeared on the bus 100, the integrated circuit AC 245 of the bidirectional driver T1 is thus actuated toward a HIGH value via one of the resistors R11, R12, ..., R128, respectively, and via one of the capacitors C1, C2, ..., C28, respectively. The actuated bidirectional driver T1 is now presumed to have its input/output port E21 connected to the bus 100. The feedback from the output side of the driver T1 back to the input side of the driver T1 via the resistor R21 returns this signal representing the actuated state from the driver input/output port terminal E21 to the driver input/output port terminal E11. After a sufficiently long period of time, a voltage will appear across the capacitor C1, the voltage being determined as follows:

$$U_- = 2.5\ V - 2.5\ V \times (R31/(R21+R31))$$

$$U_+ = 2.5\ V + 2.5\ V \times (R31/(R21+R31))$$

After a sufficiently long time, means that all transient processes have settled down on the bus lines L1–L28. In that case, every subsequent signal edge undergoes a hysteresis which is calculated as follows:

$$dU = U_+ - U_- = 2 \times 2.5\ V \times (R31/(R21+R31))$$

That means that after the occurrence of positive signal edges, $U_+$ is relevant, whereas after the occurrence of negative signal edges, $U_-$ is relevant. Since both of the components $U_+$ and $U_-$ are equal in magnitude, only one component need be used in the calculation if its effect is considered correctly. The EMI (electromagnetic interference) susceptibility of the bus 100 is important in this connection. If the hysteresis is chosen to be zero (i.e., when the resistance of the resistor R21 is infinite), the steady state direct voltage value (which is referred to hereafter as Vss) will appear as 2.5 Volts, which is precisely at the threshold voltage. Operation at this threshold value is forbidden primarily because there is a complete loss of the direct voltage value. If the hysteresis is selected to be a few millivolts, the signal-to-noise ratio is far too low for successful operation, since noise signals or parasitic oscillations could relatively easily initiate activity of the driver circuit T1.

A short circuit, for example, at the driver input terminal results in a loss of amplitude of the signal from the driver. Depending on whether this is a short circuit to the ground GND or to the positive supply potential VCC for all bus driver circuits, the direct voltage value at the output of the driver T1 is distorted considerably. Let it be assumed that a short circuit to ground GND exists, for example, only for one of the drivers T1–T28. Then, in the absence of other factors, the potential of the driver would be set precisely at zero. With a series resistance, such as one of the resistances R11–R128, however, the dynamic amplitude would be cut in half (due to the resistance in the driver T1 which is in the transmitter mode as well as in the drivers T2–T28 which are in the receiver mode in this example), but its maximum value would be limited to 2.5 Volts. However, this is precisely the threshold voltage, such that no "HIGH" value would be transmitted any longer. The object then is to cancel out this distortion of the direct voltage value by means of additional measures. For this purpose, one of the capacitors C1–C28, each having a sufficiently large capacitance for the purpose described above and in the following, is connected in series with a corresponding one of the series resistances R11–R128, respectively. This selected one of the capacitors C1–C28 essentially constitutes a short circuit for the steep signal edges but cuts off the distorted direct current portion of the signal.

The conditions then are as follows: if there is a driver short circuit, be it to GND or to VCC, only the signal amplitude is reduced. However, without the voltage divider resistor pairs R21 and R31, ..., R228 and R328, respectively, the direct value at the inputs of ones of the drivers T1–T28 which are in the transmitter mode would then be indefinite. Depending on the spurious current, the potential would drift upward or downward and it would again be impossible to transmit a state. This is why the voltage divider resistor pairs R21 and R31, ..., R228 and R328, respectively, are necessary to attain stability in the steady state (i.e., in which the corresponding one of the capacitors C1–C28 is in a recharged state), so as to "fix" the input potential at a value which is in the vicinity of the threshold value, but which is not too close to the threshold value. How close the input potential is to be set to the threshold value depends on the number of short circuits that are to be tolerated. A brief estimate, by way of example, is made as follows. As already mentioned, if there is a short circuit, the alternating voltage is divided (reduced) by a corresponding one of the series resistors R11, R12, ..., R128. The signal edge height is significant in this process, and the following relationship results:

$$U = 5\ V \times R11/2R11 = Umax/2 = 2.5\ Vss\ (\text{Volt peak to peak}).$$

The further indices (i.e., the sequential number following the first indice of the corresponding circuit elements) of the series resistors R11, R12, ..., and the voltage divider resistor pairs R21 and R31, ..., R228 and R328, respectively, are omitted below (i.e., each of R21–R228 are replaced by R2, etc.) since only their resistance values are included in the calculations and these are the same for all corresponding resistors (i.e., those having coinciding first indices).

Consequently, the following results for n short circuits:

$$U = 5\ V \times R1/(R1 + nR1) = Umax \times 1/(1+n)$$

For three short circuits the voltage U would thus be reduced to ¼ of 5 Volt peak to peak, for four short circuits to 1/5 of 5 Volts peak to peak.

Let it be assumed for the sake of simplicity (in actuality, conditions are somewhat more complicated as will be discussed below) that the hysteresis must lie within the amplitude determined above for the number of short circuits n equal to 5, and Vss equal to 5 V. Then the following must result for R2 and R3:

$$dU = 1\ V = |2U_+| = 5\ V \times R3/(R2+R3)$$

The resistance ratio is then:

$$R3/(R2+R3) = 1/5$$

For a first approximation this is the calculating procedure for estimating the hysteresis. Now, the somewhat more complicated conditions for a connection of all of the driver circuits 1–28 will be discussed.

So far, the approximation made was such that resistors R2 and R3 were assumed to be significantly large over their entire parallel connection along the bus line than the series resistance R1.

Initially, a criterion for determining the value of the series resistance R1 is as follows:

The input capacitance of each of the bidirectional drivers T1–T28 in the case of FACT is about 15 pF. For 28 sockets this results in a total capacitance of 420 pF. If one desires to recharge this capacitance in about 4 ns (much shorter than one clock pulse period of the data signal), the resulting series resistance in view of the time constant R1x (total capacitance will roughly be 10 Ohm.

Moreover, as already mentioned, each of the drivers T1–T28 must drive the parallel connection of all hysteresis voltage divider pairs R21 and R31, ..., R228 and R328, respectively. These can indeed have values with such a high impedance that their effect is negligible; i.e., the full amplitude is present at the driver input/output ports E21–E228 when the corresponding drivers are in the receive mode. On the other hand, it is of advantage if the parallel connection of all of the voltage dividers falls in the order of magnitude of the characteristic impedance of the line. Every transmitting one of the drivers T1–T28 then "sees" values on the order of magnitude of the characteristic impedance in both directions of the bus 100, which reduces signal reflections. Additionally, a high distributed resistive load be provided along the bus 100 for the purpose of counteracting reflections. On the other hand, there will again occur a division of the voltage between the series resistance of the drivers (e.g., T1) and the hysteresis dividers (e.g., R21 and R31, ..., R228 and R328, respectively). Here, an optimum combination of resistor values should be selected, if possible.

Another advantage is that, once the voltages across the drivers T1–T28 which are in the receiver mode (referred to hereafter as receivers) have reached the threshold during the passage of a signal edge, the receivers help in the recharging since they react on the bus 100 due to the feedback connection via the corresponding resistors R21–R228. Thus, all receivers act as bus repeaters, which is an advantage with respect to the purity of the signal. Quantified, the voltage division by the hysteresis resistances can be expressed as follows:

$$Ue = Uq \times (Rh/28)/(Rh/28 + R1)$$

where
Ue is the voltage across the receiver;
Uq is the FACT source voltage (5 Vss);
Rh is the parallel connection of voltage divider resistances R2 and R3.

Neglected here is the voltage division between R1 and Rh which are separated in value by orders of magnitude. In all these calculations only the signal edges are considered, i.e. capacitors C1, C2, ..., are considered to be alternating voltage short circuits.

Renewed hysteresis now occurs due to the voltage division between R1 and Rh/28. The renewed hysteresis increases proportional to the decrease in Rh and Rh/28. With the mentioned four permissible short circuits (Uq′=Uq/5), a receiver must be controlled beyond the threshold without interference. If one again assumes—as a worst case—that the steady state, i.e. a "0" or a "1", is present on the bus 100 for a long time, a rise of a minimum of 0.5 Volt is necessary to accomplish this, if the above calculated ratio of R3/(R2 +R3) remains, because these resistances have then set the input potential up or down from the threshold by this value. If, thus Uq′=Uq/5=1Vss, the associated source impedance (four short circuits) is 1/5×R1=2 Ohm. In order for Ue to now drop to one-half, Rh/28 can now also be set at 2 Ohm, i.e. Rh=56 Ohm. This, however, is merely a theoretical value, since:

(1) the drivers do not have a vanishing output impedance; and (2) for reasons of reliability, the power consumption for handling the thermal load of the bus 100 must not be set too high.

Since, moreover, the critical hysteresis limit needs not necessarily be reached, let us turn to the criterion of "characteristic impedance consideration". A driver (e.g., T14), when it feeds a signal into the middle of the bus 100, should "see" the characteristic impedance of the bus 100 on both sides thereof. If the characteristic impedance of the line is, e.g., 200 Ohm, each half has 100 Ohm and consequently Rh/28=100 Ohm and Rh=2.8 KOhm. From this result the dimensions of the resistances shown in FIG. 1 are as follows: R2=12 KOhm, and R3=3.3 KOhm.

Thus, the maximum voltage division between R1 and Rh/28 is now only:

$$Ue = Uq/(n+1) \times 100/(100 + 10/(n+1)) = 0.5 \text{ V}$$

(where n is again assumed to be the number of short circuits).

This results for n in a maximum of eight short circuits. But this limit should not be reached for the sake of noise margin.

The current consumption of the drivers T1–T28 is determined almost exclusively by the external connections to these drivers. The interface arrangement presented here is well suited for use e.g. in onboard processing systems in satellites, particularly since resistor faults almost always become evident only by an interruption and even short circuits in series capacitors have a disadvantageous effect only if the associated driver also malfunctions due to a short circuit. However, this case occurs only with a very low compound probability.

Figure 2:
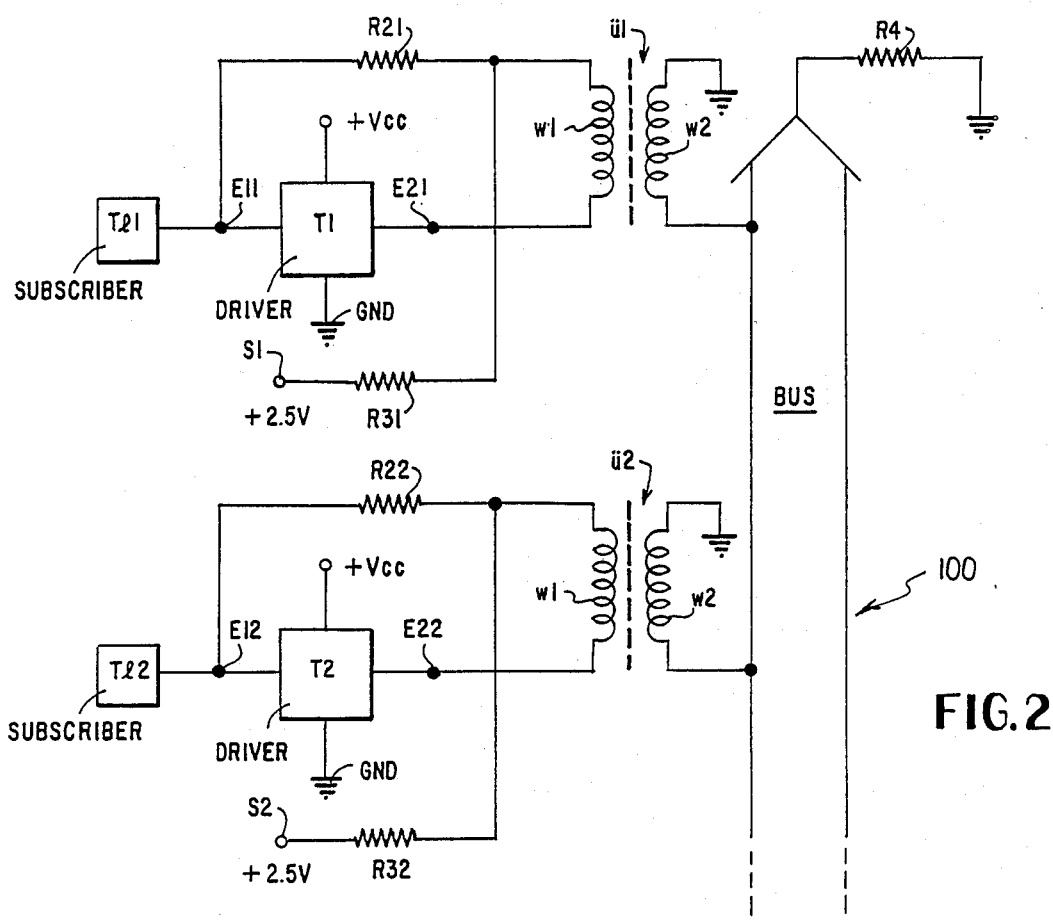
FIG. 2 shows a second embodiment of the invention having a transformer in each branch circuit.

The direct voltage splitting may also take place in a manner other than described above, e.g. by means of a transformer Ü1, Ü2, ..., Ü28, as shown in FIG. 2, wherein like numerals in FIG. 1 indicate like elements. The respective secondary winding w2 of each transformer may be connected, for example, directly to the bus 100. The primary respective winding w1 of each transformer has one terminal connected to the driver input/output port E21 and its other terminal to the divider tap of the voltage divider composed of resistors R21 and R31, R22 and R32, ..., respectively. For determining the values of the voltage divider resistances, it must be assumed that they must be so highly resistant, on the one hand, that the short circuit of one driver is not transformed to the bus 100 as a short circuit or as too low an impedance and on the other hand, that their resistances must be low enough that each of the drivers T1–T28 is able to transform sufficient power to the bus 100 in the forward direction to actuate all other drivers operated as receivers by way of their associated transformers. In reality, all of the driver power is not transmitted to the bus 100 due to stray losses in the transformers. The foregoing requirements are met if the alternating voltage parallel impedance of resistors R2 and R3 has a magnitude which is within an order of magnitude of 100 Ohm. A high frequency ferrite core transformer is preferably employed in the transformers Ü1, Ü2, ..., etc. Use of a transformer as the direct voltage splitting means requires fewer components than the previously presented solution employing a capacitor in the direct voltage splitting circuit. The probability of failure of these high frequency ferrite core transformers can be reduced by special structural measures (e.g., casting, or arranging windings so that the turns are spaced far apart).

Figure 3:
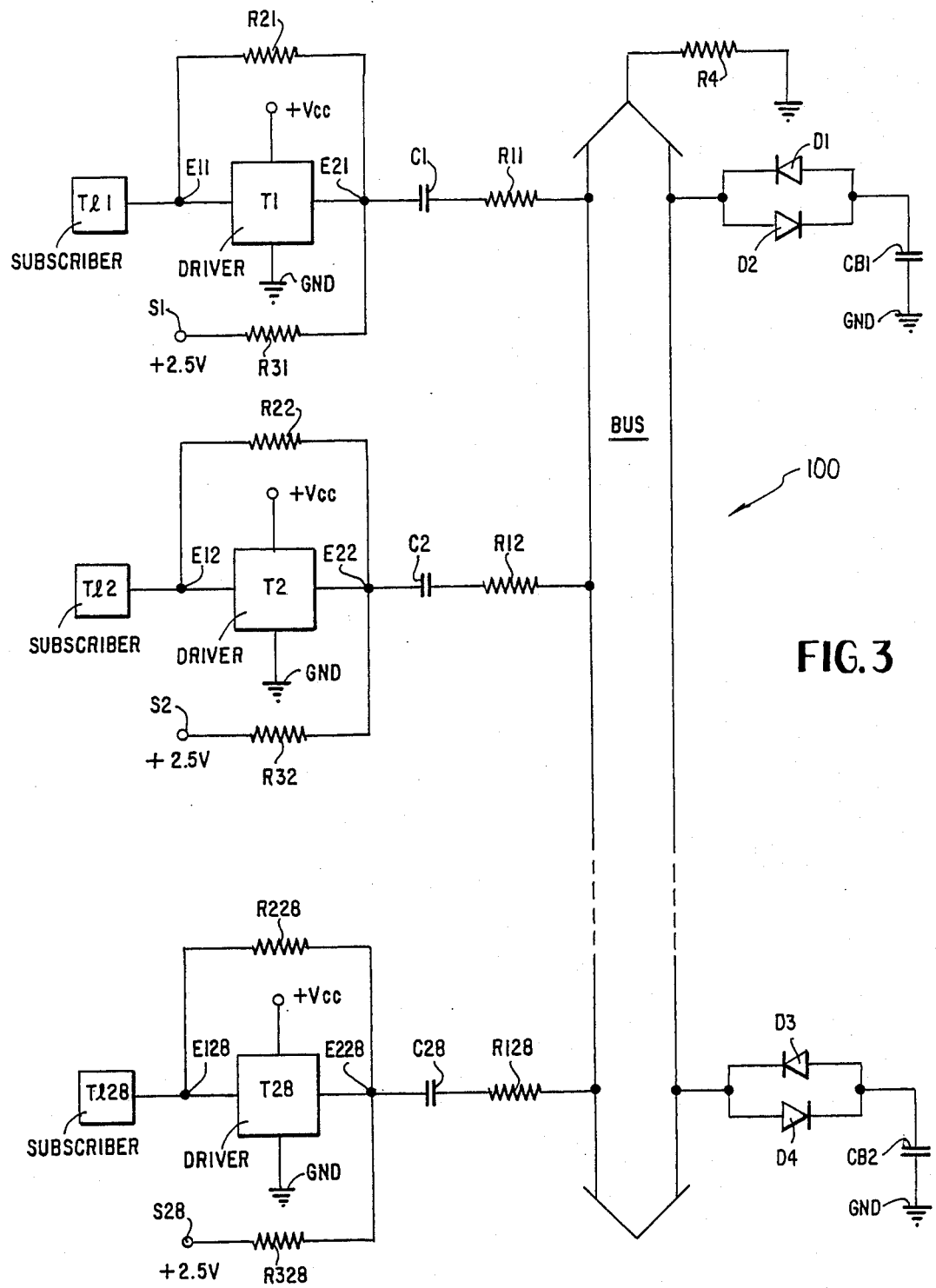
FIG. 3 shows another embodiment of the invention in which the bus is terminated on both sides by components exhibiting threshold behavior.

In an embodiment of the invention shown in FIG. 3, wherein like elements in FIG. 1 have like numerals, the bus 100 is terminated on both sides by components exhibiting threshold behavior. In the embodiment of FIG. 3, these components exhibiting threshold behavior are diodes D1, D2 which are in anti-parallel relationship to each other and are connected to ground potential GND at the sequential lower end of the bus 100. Diodes D3, D4 are likewise disposed in anti-parallel relationship to each other and are connected at the sequential upper end of the bus 100. The threshold voltage $U_S$ of these components—here diodes—must be greater than the hysteresis rise $U_H$ of the hysteresis circuit for the drivers T1, T2, ..., etc. If the hysteresis rise $U_H$ is, for example, 0.625 V, silicon diodes can be employed which have a threshold voltage of $U_S=0.7$ V. For signal amplitudes of less than 0.7 V in the bus 100, the bus 100 is "open;" i.e., only an ohmic bus 100 grounding resistor R4 is effective. If the signal amplitudes on the bus 100 again rise beyond $U_S$, the excess amplitude components are cut off at +0.7 V. If a short circuit now occurs, e.g. at a driver input/output E21, E22, etc., the bus 100 is additionally charged, with respect to an alternating voltage, with the corresponding resistor R11, ... R128, where the driver short circuit occurs. This reduces the signal amplitudes on the bus 100. The corresponding resistor R11, ..., R128 then takes over the termination of the bus 100. With such a short circuit, the load in the form of one of the resistors R11, R128 may cause the signal amplitudes on the bus 100, which previously were sufficient to actuate diodes D1, D2, D3 and D4, to drop to such a degree that the threshold $U_S$ is no longer reached. At very high signal amplitudes on the bus 100 it is possible that, in spite of the additional load represented by one of resistors R11, ... R128, the threshold $U_S$ is reached and the following voltage divider behavior results:

The bus 100 is then terminated by the respective one of the resistors R11, ..., R28 and by the path resistance of the diodes D1, D2, D3 and D4, respectively. Resistor R4 has a resistance which is greater by several orders of magnitude than the respective resistances of the resistors R11, ..., R128, and the path resistances of diodes D1, D2, D3 and D4, respectively, so that the resistor R4 does not participate in the voltage divider behavior. Advantageously, a direct voltage splitting capacitor CB1 and CB2, respectively, should be connected to ground in series with one of the limiter diode pairs D1, D2 or D3, D4. These capacitors CB1 and CB2 must be selected to have such a high capacitance that the direct voltage value for the hysteresis circuits can still be regenerated from the edges of the transmittable data. It is best to select the capacitors CB1 and CB2 to be of the same size as each of the capacitors C1–C28.

Figure 4:
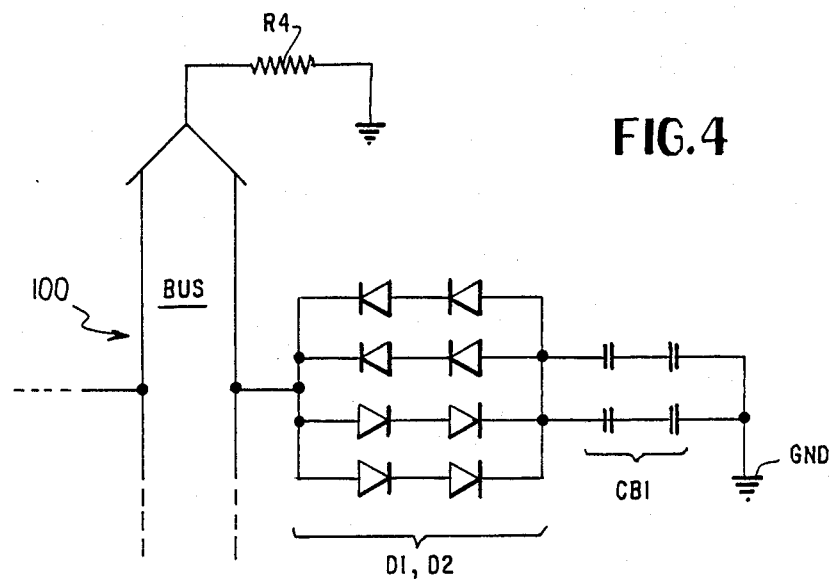
FIG. 4 shows a further embodiment of the invention having a fault tolerant bus termination.

To increase fault tolerance, particularly for use in satellites, it is advisable to provide a plurality of groups of diodes as shown in FIG. 4, in which like elements in FIG. 1 have like numerals, corresponding to the diodes D1 to D4 and a plurality of groups of capacitors corresponding to the capacitor means CB1 and CB2. As shown in FIG. 4, diode means D1 and D2 include two series parallel connections of diodes arranged in anti-parallel relationship to one another. A corresponding direct voltage splitting capacitor means CB1 is composed of four partial capacitors—in this case, two series connected capacitors combined into a parallel circuit. Of course, care must be taken in these circuit variations that the corresponding threshold value $U_S$ and the total capacitance CB1 and CB2, respectively, are tuned to the bus 100 and to the other components.

The bus coupling circuit according to the present invention permits the realization of an amplitude dependent, passive, dynamic bus termination as referred to in FIG. 3 which results in an effective stabilization of the signal amplitudes on the bus 100.

Instead of terminating a bus 100 with components exhibiting threshold behavior, the resistance values of the voltage divider resistors R31, R32, ... between the respective driver input/output ports E21, E22, ..., etc., near the bus 100 and the current supply can be selected with respect to those drivers which are disposed in the vicinity of an end of the bus 100—e.g. the last two or three drivers in the vicinity of one end of the bus 100—so that their common parallel resistance, i.e. the resistance value formed by the parallel connection, approximately corresponds to the characteristic impedance of the bus 100.

It will be understood that the above description of the present invention is susceptible to various modifications, changes and adaptations, and the same are intended to be comprehended within the meaning and range of equivalents of the appended claims.

What is claimed is:

1. In a bus coupling circuit for coupling data between a transmitting subscriber and a receiving subscriber by way of a data transfer bus, each subscriber including: a bidirectional driver for transmitting and receiving data, each bidirectional driver including means for reintroducing a direct voltage at a bus-side input/output port of each driver, and direct voltage splitting means constituting a working impedance for the driver and connected between the driver and the bus; each driver having a first input/output port which is remote from the bus and a second input/output port electrically connected to the bus, the improvement comprising:

a source of direct supply voltage;

a hysteresis circuit connected to each driver, said hysteresis circuit including a voltage divider which is responsive to alternating signals on the bus and which is disposed between the first input/output port of the driver and said source of direct supply voltage, said voltage divider having a divider tap disposed at the second driver input/output port to provide a direct supply voltage at the second input/output port of the driver;

said voltage divider having a first voltage divider resistor connected between the first and second driver input/output ports and a second voltage divider resistor connected between the second driver input/output port and said source of direct supply voltage, the first and second voltage divider resistors having respective resistance values R2x and R3x which satisfy the following relationship:

$$\frac{R3x}{R2x + R3x} = \frac{1}{1 + n}$$

where x is a variable representing the sequential number of the respective subscriber, and n is the number of tolerable driver short circuits; whereby the bus is fault tolerant for a plurality n of driver short circuits.

2. A bus coupling circuit as defined in claim 1, wherein said direct voltage splitting means includes a series connection of a capacitor and a resistor.

3. A bus coupling circuit as defined in claim 1, further comprising a bus grounding resistor connected to both end of the bus.

4. A bus coupling circuit as defined in claim 1, further comprising threshold component means connected for terminating the bus at both sides, and each driver when actuated having a response threshold higher than the hysteresis rise of the hysteresis circuit.

5. A bus coupling arrangement as defined in claim 1, further comprising a further circuit having a pair of diodes connected in parallel and being poled in opposite directions, said further circuit being connected between an end of the bus and ground potential.

6. A bus coupling arrangement as defined in claim 5, wherein said further circuit includes capacitor means for filtering out DC components.

7. A bus coupling arrangement as defined in claim 4, further comprising a plurality of said threshold component means exhibiting threshold behavior for increased fault tolerance.

8. A bus coupling arrangement as defined in claim 6, wherein said capacitor means has a capacitance which is sufficiently large that the direct voltage of the hysteresis circuit can be regenerated from signal edges of the transmitted data.

9. A bus coupling arrangement as defined in claim 6, wherein said direct voltage splitting means includes a first capacitor having a specified capacitance, and said direct voltage splitting capacitor has a capacitance which is substantially the same as said specified capacitance.

10. A bus coupling arrangement as defined in claim 3, wherein each of said second voltage divider resistors associated with the drivers disposed in the vicinity of the end of the bus have resistances which present a common parallel resistance approximately corresponding to the characteristic impedance of the bus.

11. A bus coupling arrangement as defined in claim 5, wherein said further circuit comprises a plurality of pairs of said diodes.

12. A bus coupling arrangement as defined in claim 6, wherein said capacitor means includes a plurality of individual capacitors connected in a circuit for increased fault tolerance.

* * * * *